US011296730B2

(12) United States Patent
Takeuchi

(10) Patent No.: US 11,296,730 B2
(45) Date of Patent: Apr. 5, 2022

(54) RADIO-FREQUENCY FRONT-END CIRCUIT

(71) Applicant: Murata Manufacturing Co., Ltd., Kyoto (JP)

(72) Inventor: Morio Takeuchi, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 17/029,584

(22) Filed: Sep. 23, 2020

(65) Prior Publication Data

US 2021/0006272 A1 Jan. 7, 2021

Related U.S. Application Data

(63) Continuation of application No. PCT/JP2019/010270, filed on Mar. 13, 2019.

(30) Foreign Application Priority Data

Mar. 29, 2018 (JP) .............................. JP2018-064042

(51) Int. Cl.
*H04B 1/00* (2006.01)
*H04B 1/04* (2006.01)
*H04B 1/16* (2006.01)

(52) U.S. Cl.
CPC ........... *H04B 1/006* (2013.01); *H04B 1/0078* (2013.01); *H04B 1/04* (2013.01); *H04B 1/1607* (2013.01)

(58) Field of Classification Search
CPC ........ H04B 1/006; H04B 1/0078; H04B 1/04; H04B 1/1607
See application file for complete search history.

(56) References Cited

U.S. PATENT DOCUMENTS 6,204,813 B1 * 3/2001 Wadell ............... A63B 24/0021
342/463
8,803,632 B2 * 8/2014 Takeuchi ................. H03H 7/38
333/101

(Continued)

FOREIGN PATENT DOCUMENTS

CN 107733448 A 2/2018
JP 2014050098 A 3/2014

(Continued)

OTHER PUBLICATIONS

International Search Report issued in Application No. PCT/JP2019/010270, dated May 28, 2019.

(Continued)

*Primary Examiner* — Janice N Tieu
(74) *Attorney, Agent, or Firm* — Pearne & Gordon LLP

(57) ABSTRACT

A radio-frequency front-end circuit includes first and second radio-frequency switches and filters. The first radio-frequency switch includes a first antenna-side terminal and a plurality of first filter-side terminals selectively coupled to the first antenna-side terminal. The second radio-frequency switch includes a second antenna-side terminal and a plurality of second filter-side terminals selectively coupled to the second antenna-side terminal. Some of the filters are multiplexer filters and each includes a common terminal. The common terminals of the filters are coupled individually to some of the first filter-side terminals of the first radio-frequency switch. The second antenna-side terminal of the second radio-frequency switch is coupled to the remaining one of the first filter-side terminals of the first radio-frequency switch.

11 Claims, 6 Drawing Sheets

(56) References Cited

U.S. PATENT DOCUMENTS

| | | | |
|---|---|---|---|
| 10,257,119 B2* | 4/2019 | Wloczysiak | H04W 40/02 |
| 2013/0272176 A1 | 10/2013 | Uejima | |
| 2014/0062614 A1 | 3/2014 | Park | |
| 2014/0167877 A1 | 6/2014 | Shimizu et al. | |
| 2015/0028963 A1 | 1/2015 | Ebihara et al. | |
| 2017/0048859 A1 | 2/2017 | Hayakawa | |
| 2017/0331458 A1 | 11/2017 | Tomita et al. | |
| 2018/0019730 A1 | 1/2018 | Takeuchi et al. | |
| 2018/0048308 A1 | 2/2018 | Oshita et al. | |
| 2018/0063031 A1 | 3/2018 | Wloczysiak et al. | |
| 2018/0343000 A1 | 11/2018 | Nosaka | |

FOREIGN PATENT DOCUMENTS

| | | |
|---|---|---|
| JP | 2015023557 A | 2/2015 |
| JP | 2016054515 A | 4/2016 |
| JP | 2017038352 A | 2/2017 |
| JP | 2017204761 A | 11/2017 |
| JP | 2018019392 A | 2/2018 |
| KR | 10-2004-0076682 A | 9/2004 |
| WO | 2012093539 A1 | 7/2012 |
| WO | 2017138539 A1 | 8/2017 |

OTHER PUBLICATIONS

Written Opinion issued in Application No. PCT/JP2019/010270, dated May 28, 2019.
Office Action for Korean Patent Application No. 10-2020-7025180 dated Sep. 3, 2021.

* cited by examiner

RADIO-FREQUENCY FRONT-END CIRCUIT

This is a continuation of International Application No. PCT/JP2019/010270 filed on Mar. 13, 2019 which claims priority from Japanese Patent Application No. 2018-064042 filed on Mar. 29, 2018. The contents of these applications are incorporated herein by reference in their entireties.

BACKGROUND

The present disclosure relates to a radio-frequency front-end circuit for communicating radio frequency signals in a plurality of communication bands.

In recent years, communication terminals, such as mobile communication devices are required to be downsized and also required to support a plurality of communication bands by a single communication terminal.

To implement such communication terminals, for example, a radio-frequency module described in Japanese Unexamined Patent Application Publication No. 2014-050098 (Patent Document 1) includes a switch element and multiple kinds of filters.

The switch element includes an antenna-side connection terminal coupled to an antenna and a plurality of filter-side connection terminals coupled to the filters. The switch element selectively connects the plurality of filter-side connection terminals to the antenna-side connection terminal.

The multiple kinds of filters include a duplexer in which two filters are bundled together and a single filter constituted by one kind of filter. The duplexer and the single filter are coupled individually to different filter-side connection terminals of the switch element.

BRIEF SUMMARY

In the radio-frequency module described in Patent Document 1, as the number of communication bands increases, the number of terminals switched by the switch element simply increases. Then, in the switch element, as the number of terminals to be switched increases, the insertion loss due to each of the switched terminals increases.

Moreover, it is difficult to control the characteristics of a multiplexer, such as a duplexer, in which a plurality of filters are bundled together.

Hence, with the configuration described in Patent Document 1, the transfer characteristic of the module may be degraded.

The present disclosure provides a radio-frequency front-end circuit that can suppress deterioration of the transfer characteristic when radio-frequency switches included in the radio-frequency front-end circuit are required to switch a relatively large number of filters.

A radio-frequency front-end circuit according to embodiments of the present disclosure includes a first radio-frequency switch, a second radio-frequency switch, a multiplexer including a common terminal, and a plurality of single filters. The first radio-frequency switch includes a first antenna-side terminal and a plurality of first filter-side terminals and is configured to selectively connect the plurality of first filter-side terminals to the first antenna-side terminal. The second radio-frequency switch includes a second antenna-side terminal and a plurality of second filter-side terminals and is configured to selectively connect the plurality of second filter-side terminals to the second antenna-side terminal. The plurality of single filters are coupled respectively to the plurality of second filter-side terminals. The second antenna-side terminal is coupled to at least one first filter-side terminal of the plurality of first filter-side terminals. The common terminal of the multiplexer is coupled to another first filter-side terminal of the plurality of first filter-side terminals of the first radio-frequency switch, the other first filter-side terminal being different from the at least one first filter-side terminal coupled to the second antenna-side terminal.

In this configuration, the multiplexer is coupled to the antenna-side via only the first radio-frequency switch while the single filters are coupled to the antenna-side via the second radio-frequency switch and the first radio-frequency switch. As for multiplexers, it is difficult to control characteristics and the insertion loss is easily degraded. By contrast, as for single filters, it is relatively easy to control characteristics and the insertion loss is unlikely to be degraded. Moreover, as the number of filter-side terminals of a radio-frequency switch decreases, the characteristics improve; in contrast, as the number of filter-side terminals increases, the characteristics are likely to be degraded along with this increase. To decrease the number of filter-side terminals of one radio-frequency switch without necessarily changing the number of communication bands selected for a radio-frequency front-end circuit, for example, a plurality of radio-frequency switches can be provided in multiple stages. However, when the number of stages of coupled radio-frequency switches increases, the transmission loss is likely to increase. Hence, the single filter is coupled to an antenna via radio-frequency switches provided in two stages, which are the first radio-frequency switch and the second radio-frequency switch, while the multiplexer is coupled to the antenna via a radio-frequency switch provided in one stage. With this configuration, the loss caused by using a multiplexer and the loss caused by using radio-frequency switches in multiple stages are not added up, and as a result, the decrease of the minimum-level transmission loss of a radio-frequency front-end circuit is suppressed.

The radio-frequency front-end circuit according to embodiments of the present disclosure can have a configuration described below. The first radio-frequency switch includes first single-pole single-throw (SPST) switches and second SPST switches. The first SPST switches are respectively coupled between the first antenna-side terminal and the plurality of first filter-side terminals and configured to switch between connection and disconnection between these terminals. The second SPST switches are respectively coupled between the first SPST switches and a reference potential and configured to switch between connection and disconnection between these terminals.

With this configuration, the effect of open capacitance of the first radio-frequency switch is suppressed.

The radio-frequency front-end circuit according to embodiments of the present disclosure may have a configuration described below. The first radio-frequency switch concurrently connects two or more of the plurality of first filter-side terminals to the first antenna-side terminal.

This configuration enables simultaneous communications using a plurality of communication bands by carrier aggregation. Particularly, in the configuration including the first SPST switches and the second SPST switches, an excellent transfer characteristic can be achieved with respect to radio frequency signals in the communication bands for simultaneous communication of carrier aggregation.

The radio-frequency front-end circuit according to embodiments of the present disclosure can have a configuration described below. The second radio-frequency switch is composed of third SPST switches. The third SPST switches are respectively coupled between the second antenna-side terminal and the plurality of second filter-side terminals and configured to switch between connection and disconnection between these terminals.

With this configuration, the second radio-frequency switch is downsized.

In the radio-frequency front-end circuit according to embodiments of the present disclosure, the conductive resistance of the second radio-frequency switch can be lower than the conductive resistance of the first radio-frequency switch.

With this configuration, the resistance of the transmission path pathing through the first radio-frequency switch and the second radio-frequency switch is maintained at a low level.

In the radio-frequency front-end circuit according to embodiments of the present disclosure, the open capacitance of the first radio-frequency switch can be lower than the open capacitance of the second radio-frequency switch.

With this configuration, in the first radio-frequency switch, the effect of open capacitance on radio frequency signals transferred through the multiplexer is suppressed.

In the radio-frequency front-end circuit according to embodiments of the present disclosure, the second filter-side terminals can be less in number than the first filter-side terminals.

With this configuration, the loss of radio frequency signals transferred through the single filter is suppressed.

The present disclosure can suppress deterioration of the transfer characteristic and achieve an excellent transfer characteristic with the configuration including radio-frequency switches and a plurality of filters configured to be switched by the radio-frequency switches.

Other features, elements, and characteristics of the present disclosure will become more apparent from the following detailed description of embodiments of the present disclosure with reference to the attached drawings.

DETAILED DESCRIPTION

Figure 1:
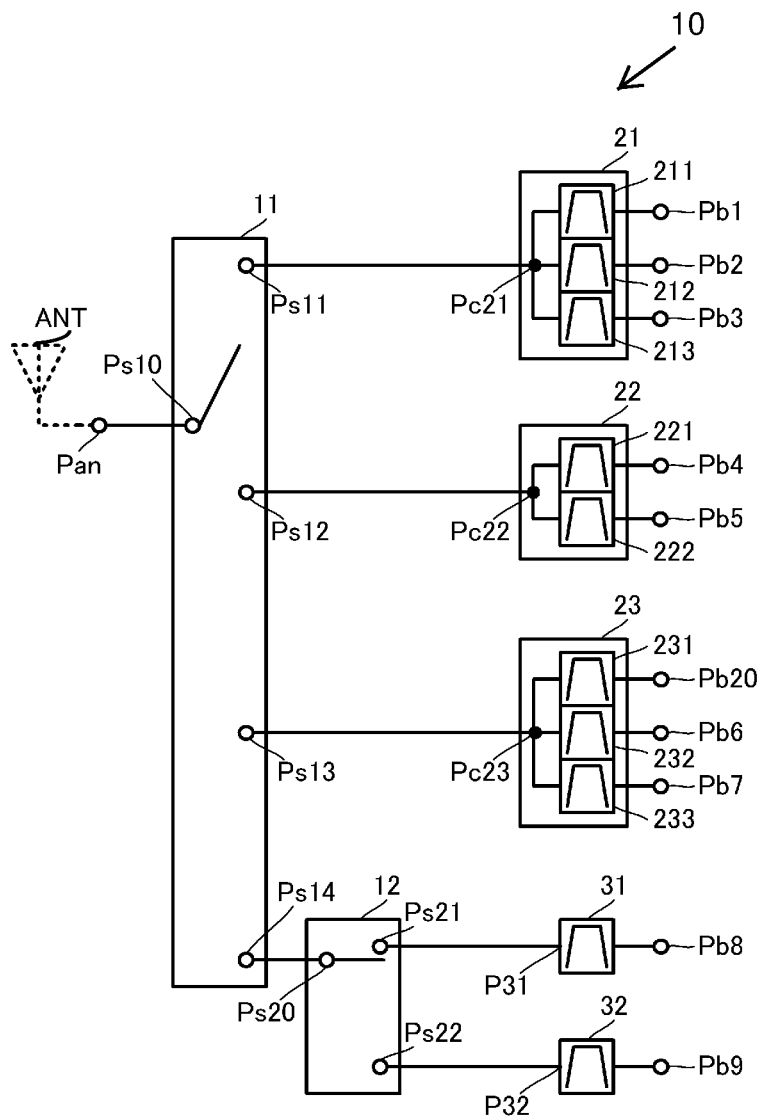
FIG. 1 is a circuit diagram of a radio-frequency front-end circuit according to a first embodiment of the present disclosure.

A radio-frequency front-end circuit according to a first embodiment of the present disclosure is described with reference to drawings. FIG. 1 is a circuit diagram of a radio-frequency front-end circuit 10 according to the first embodiment of the present disclosure.

The radio-frequency front-end circuit described below has a circuit that receives downlink radio frequency signals in a plurality of communication bands. However, the following configuration is also applicable to a circuit that transmits uplink radio frequency signals and also applicable to a circuit that transmits uplink radio frequency signals and receives downlink radio frequency signals.

As illustrated in FIG. 1, the radio-frequency front-end circuit 10 includes a radio-frequency switch 11, a radio-frequency switch 12, and filters 21, 22, 23, 31, and 32. The radio-frequency front-end circuit 10 also includes terminals Pan, Pb1, Pb2, Pb3, Pb4, Pb5, Pb20, Pb6, Pb7, Pb8, and Pb9.

The radio-frequency switch 11 corresponds to a "first radio-frequency switch" of the present disclosure and the radio-frequency switch 12 corresponds to a "second radio-frequency switch" of the present disclosure. The filters 21, 22, and 23 correspond to a "multiplexer" of the present disclosure and the filters 31 and 32 correspond to a "single filter" of the present disclosure.

The radio-frequency switch 11 is a single-pole n-throw (SPnT) switch (n=4 in this embodiment). The radio-frequency switch 11 is formed by using, for example, a semiconductor. The radio-frequency switch 11 includes one antenna-side terminal Ps10 and a plurality of filter-side terminals Ps11, Ps12, Ps13, and Ps14. The radio-frequency switch 11 selectively connects any of the terminals Ps11, Ps12, Ps13, and Ps14 to the terminal Ps10.

The radio-frequency switch 12 is an SPnT switch (n=2 in this embodiment). The radio-frequency switch 12 is formed by using, for example, a semiconductor. The radio-frequency switch 12 includes one antenna-side terminal Ps20 and a plurality of filter-side terminals Ps21 and Ps22. The radio-frequency switch 12 selectively connects either the terminal Ps21 or Ps22 to the terminal Ps20.

The terminal Ps11 of the radio-frequency switch 11 is coupled to the filter 21, the terminal Ps12 is coupled to the filter 22, and the terminal Ps13 is coupled to the filter 23. The terminal Ps14 of the radio-frequency switch 11 is coupled to the terminal Ps20 of the radio-frequency switch 12. The terminal Ps21 of the radio-frequency switch 12 is coupled to the filter 31 and the terminal Ps22 is coupled to the filter 32.

The filters 21, 22, 23, 31, and 32 are each formed by using, for example, a surface acoustic wave (SAW) resonator or the like.

The filter 21 includes filters 211, 212, and 213. The filters 211, 212, and 213 each pass radio frequency signals in one communication band and attenuate radio frequency signals in other communication bands. This means that each of the filters 211, 212, and 213 is a single filter. The pass band of the filter 211, the pass band of the filter 212, and the pass band of the filter 213 are different from each other.

One terminal of the filter 211, one terminal of the filter 212, and one terminal of the filter 213 are coupled to each other and this connection point is a common terminal Pc21 of the filter 21. This means that the filter 21 is a multiplexer.

The common terminal Pc21 of the filter 21 is coupled to the terminal Ps11 of the radio-frequency switch 11. The other terminal of the filter 211 is coupled to the terminal Pb1 of the radio-frequency front-end circuit 10, the other terminal of the filter 212 is coupled to the terminal Pb2 of the radio-frequency front-end circuit 10, and the other terminal of the filter 213 is coupled to the terminal Pb3 of the radio-frequency front-end circuit 10.

The filter 22 includes filters 221 and 222. The filters 221 and 222, each pass radio frequency signals in one kind of communication band and attenuate radio frequency signals in other communication bands. This means that each of the filters 221 and 222 is a single filter. The pass band of the filter 221 and the pass band of the filter 222 are different from each other.

One terminal of the filter 221 and one terminal of the filter 222 are coupled to each other and this connection point is a common terminal Pc22 of the filter 22. This means that the filter 22 is a multiplexer.

The common terminal Pc22 of the filter 22 is coupled to the terminal Ps12 of the radio-frequency switch 11. The other terminal of the filter 221 is coupled to the terminal Pb4 of the radio-frequency front-end circuit 10 and the other terminal of the filter 222 is coupled to the terminal Pb5 of the radio-frequency front-end circuit 10.

The filter 23 includes filters 231, 232, and 233. The filters 231, 232, and 233, each pass radio frequency signals in one kind of communication band and attenuate radio frequency signals in other communication bands. This means that each of the filters 231, 232, and 233 is a single filter. The pass band of the filter 231, the pass band of the filter 232, and the pass band of the filter 233 are different from each other.

One terminal of the filter 231, one terminal of the filter 232, and one terminal of the filter 233 are coupled to each other and this connection point is a common terminal Pc23 of the filter 23. This means that the filter 23 is a multiplexer.

The common terminal Pc23 of the filter 23 is coupled to the terminal Ps13 of the radio-frequency switch 11. The other terminal of the filter 231 is coupled to the terminal Pb20 of the radio-frequency front-end circuit 10, the other terminal of the filter 232 is coupled to the terminal Pb6 of the radio-frequency front-end circuit 10, and the other terminal of the filter 233 is coupled to the terminal Pb7 of the radio-frequency front-end circuit 10.

The filter 31 passes radio frequency signals in one kind of communication band and attenuates radio frequency signals in other communication bands. One terminal P31 of the filter 31 is coupled to the terminal Ps21 of the radio-frequency switch 12 and the other terminal of the filter 31 is coupled to the terminal Pb8 of the radio-frequency front-end circuit 10.

The filter 32 passes radio frequency signals in one kind of communication band and attenuates radio frequency signals in other communication bands. One terminal P32 of the filter 32 is coupled to the terminal Ps22 of the radio-frequency switch 12 and the other terminal of the filter 32 is coupled to the terminal Pb9 of the radio-frequency front-end circuit 10.

As described above, the multiplexer-type filters 21, 22, and 23 are connected to the terminal Pan via only the radio-frequency switch 11. By contrast, the single-filter-type filters 31 and 32 are connected to the terminal Pan via the radio-frequency switches 12 and 11.

It is not easy to control the characteristics of the multiplexer-type filters 21, 22, and 23 and the insertion loss of the multiplexer-type filters 21, 22, and 23 is easily degraded in comparison to the single-filter-type filters 31 and 32.

However, with the configuration of the radio-frequency front-end circuit 10, radio frequency signals in the communication bands transferred through the multiplexer-type filters 21, 22, and 23 travel via only the radio-frequency switch 11 and do not travel via the radio-frequency switch 12. As a result, the transmission loss between the terminal Pan and each of the terminals Pb1, Pb2, Pb3, Pb4, Pb5, Pb20, Pb6, and Pb7 is suppressed.

Furthermore, in the configuration of the radio-frequency front-end circuit 10, the filters 31 and 32 are configured to be selectively connected to the radio-frequency switch 11 via the radio-frequency switch 12. With this configuration, the number of terminals of the radio-frequency switch 11 can be reduced in comparison to a configuration in which the filters 31 and 32 are directly coupled to the radio-frequency switch 11. Accordingly, the loss of the radio-frequency switch 11 is reduced. As a result, the transmission loss between the terminal Pan and each of the terminals Pb1, Pb2, Pb3, Pb4, Pb5, Pb20, Pb6, and Pb7 is further suppressed. Additionally, the radio-frequency switch 11 can be downsized.

Since the filters 31 and 32 are single filters, the insertion loss is smaller than that of the multiplexer filters 21, 22, and 23. The amount of decrease in insertion loss is greater than the amount of increase in loss when the radio-frequency switches 11 and 12 are coupled in two stages. This means that, in comparison to a configuration in which the number of terminals of the radio-frequency switch 11 is increased and the filters 31 and 32 are configured as multiplexers, the loss can be suppressed more with the configuration in which the number of terminals of the radio-frequency switch 11 is reduced and the radio-frequency switch 12 having a reduced number of terminals and the radio-frequency switch 11 are coupled in two stages and the single filters 31 and 32 are coupled. Thus, when the radio-frequency switches 11 and 12 are coupled in two stages and the filters 31 and 32 are coupled, the increase in the transmission loss between the terminal Pan and each of the terminals Pb8 and Pb9 is suppressed.

As described above, by using the configuration of the radio-frequency front-end circuit 10, it is possible to suppress the increase of the minimum-level transmission loss of the radio-frequency front-end circuit 10 in the configuration including multiplexer filters and single filters.

Thus, by using the configuration of the radio-frequency front-end circuit 10, it is possible to suppress deterioration of the transfer characteristic with the configuration including radio-frequency switches, and multiplexer filters and single filters that can be switched by the radio-frequency switches, and accordingly, an excellent transfer characteristic can be achieved.

In particular, the power level of receive signals is significantly lower than the power level of transmit signals. By using the configuration of the radio-frequency front-end circuit 10, an excellent reception characteristic can be achieved with the configuration including multiplexer filters and single filters that can be switched by radio-frequency switches.

Figure 2A:
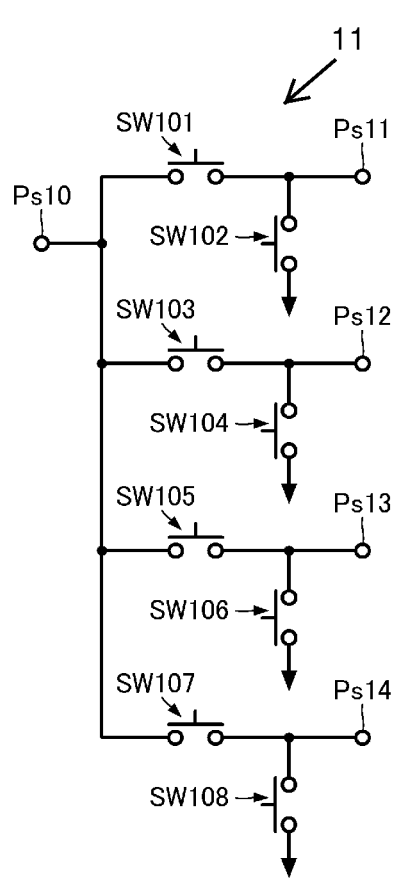
FIG. 2A is a circuit diagram of a radio-frequency switch of the radio-frequency front-end circuit according to the first embodiment of the present disclosure and FIG. 2B is a circuit diagram of another radio-frequency switch of the radio-frequency front-end circuit according to the first embodiment of the present disclosure.
Figure 2B:
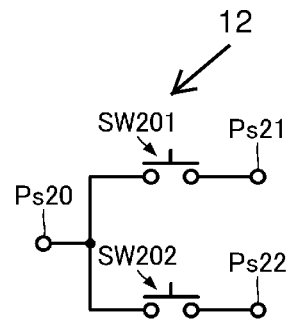

In the radio-frequency front-end circuit 10, the radio-frequency switches 11 and 12 are configured as follows. FIG. 2A is a circuit diagram of the radio-frequency switch 11 of the radio-frequency front-end circuit 10 according to the first embodiment of the present disclosure and FIG. 2B is a circuit diagram of the radio-frequency switch 12 of the radio-frequency front-end circuit 10 according to the first embodiment of the present disclosure.

As illustrated in FIG. 2A, the radio-frequency switch 11 includes switches SW101, SW102, SW103, SW104, SW105, SW106, SW107, and SW108. The switches SW101, SW102, SW103, SW104, SW105, SW106, SW107, and SW108 are single-pole single-throw (SPST) switches and each switch between connection and disconnection of corresponding end terminals.

One end of the switch SW101 is coupled to the terminal Ps10 and the other end of the switch SW101 is coupled to the terminal Ps11. One end of the switch SW102 is coupled to the other end of the switch SW101 and the other end of the switch SW102 is coupled to a reference potential (for example, ground potential).

One end of the switch SW103 is coupled to the terminal Ps10 and the other end of the switch SW103 is coupled to the terminal Ps12. One end of the switch SW104 is coupled to the other end of the switch SW103 and the other end of the switch SW104 is coupled to a reference potential (for example, ground potential).

One end of the switch SW105 is coupled to the terminal Ps10 and the other end of the switch SW105 is coupled to the terminal Ps13. One end of the switch SW106 is coupled to the other end of the switch SW105 and the other end of the switch SW106 is coupled to a reference potential (for example, ground potential).

One end of the switch SW107 is coupled to the terminal Ps10 and the other end of the switch SW107 is coupled to the terminal Ps14. One end of the switch SW108 is coupled to the other end of the switch SW107 and the other end of the switch SW108 is coupled to a reference potential (for example, ground potential).

In the case in which a radio frequency signal in a communication band corresponding to the filter 21 is transferred, the switch SW101 is in a connected state and the switch SW102 is in an open state. At this time, the switches SW103, SW105, and SW107 are in an open state and the switches SW104, SW106, and SW108 are in a connected state.

In the case in which a radio frequency signal in a communication band corresponding to the filter 22 is transferred, the switch SW103 is in a connected state and the switch SW104 is in an open state. At this time, the switches SW101, SW105, and SW107 are in an open state and the switches SW102, SW106, and SW108 are in a connected state.

In the case in which a radio frequency signal in a communication band corresponding to the filter 23 is transferred, the switch SW105 is in a connected state and the switch SW106 is in an open state. At this time, the switches SW101, SW103, and SW107 are in an open state and the switches SW102, SW104, and SW108 are in a connected state.

In the case in which a radio frequency signal in a communication band corresponding to the filter 31 or 32 is transferred, the switch SW107 is in a connected state and the switch SW108 is in an open state. At this time, the switches SW101, SW103, and SW105 are in an open state and the switches SW102, SW104, and SW106 are in a connected state.

By using this configuration, the radio-frequency switch 11 can reduce the influence of the capacitance generated when a switch is open. As a result, the radio-frequency front-end circuit 10 can suppress deterioration of the transfer characteristic due to open capacitance of switch.

Furthermore, by using this configuration, high isolation can be achieved among the terminals Ps11, Ps12, Ps13, and Ps14 in the radio-frequency switch 11. As a result, the radio-frequency front-end circuit 10 can achieve an excellent transfer characteristic with respect to radio frequency signals in each communication band.

As illustrated in FIG. 2B, the radio-frequency switch 12 includes switches SW201 and SW202. The switches SW201 and SW202 are SPST switches and each switch between connection and disconnection of corresponding end terminals.

One end of the switch SW201 is coupled to the terminal Ps20 and the other end of the switch SW201 is coupled to the terminal Ps21. One end of the switch SW202 is coupled to the terminal Ps20 and the other end of the switch SW202 is coupled to the terminal Ps22.

In the case in which a radio frequency signal in a communication band corresponding to the filter 31 is transferred, the switch SW201 is in a connected state and the switch SW202 is in an open state. In the case in which a radio frequency signal in a communication band corresponding to the filter 32 is transferred, the switch SW202 is in a connected state and the switch SW201 is in an open state.

With this configuration, the radio-frequency switch 12 is downsized. Moreover, since the insertion loss of the filters 31 and 32 is less than the insertion loss of the filters 21, 22, and 23, when the radio-frequency switch 12 has such a configuration, it is still possible to suppress deterioration of the transmission loss of radio frequency signals in a communication band corresponding to the filter 31 or 32.

As illustrated by using the radio-frequency front-end circuit 10, the number of terminals that can be switched in the radio-frequency switch 12 can be smaller than the number of terminals that can be switched in the high frequency switch 11. With this configuration, the loss in the radio-frequency switch 12, that is, the radio-frequency switch in the second stage with respect to the terminal Pan is suppressed. As a result, the transmission loss of radio frequency signals in the communication bands corresponding to the filters 31 and 32 is suppressed.

Further, with the configuration described above, in the radio-frequency front-end circuit 10, an open capacitance Coff11 of the radio-frequency switch 11 can be smaller than an open capacitance Coff12 of the radio-frequency switch 12 (Coff11<Coff12). As a result, it is possible to reduce the adverse effect of open capacitance on radio frequency signals in the communication band corresponding to the filter 21, 22, or 23 and consequently suppress the transmission loss of such radio frequency signals.

Additionally, in the configuration described above, a conductive resistance R12 of the radio-frequency switch 12 is set to be lower than a conductive resistance R11 of the radio-frequency switch 11 in the radio-frequency front-end circuit 10. As a result, it is possible to suppress the increase in the transmission loss of radio frequency signals in the communication band corresponding to the filter 31 or 32 when the signals are transferred via the radio-frequency switches 11 and 12.

Therefore, the radio-frequency front-end circuit 10 with an excellent transfer characteristic can be implemented.

For example, the communication bands described later are assigned to the filters 21, 22, 23, 31, and 32 in the radio-frequency front-end circuit 10. The communication bands described later are named by using the communication band names of the long term evolution (LTE) standard as an example. The following description is based on an example of communication band assignment and communication bands may be assigned to the filters on the basis of another example.

As for the filter 21, Band 40 (2300 to 2400 MHz) is assigned as the pass band of the filter 211, Band 1 (2110 to 2170 MHz) is assigned as the pass band of the filter 212, and Band 3 (1805 to 1880 MHz) is assigned as the pass band of the filter 213. These bands are a combination of communication bands that can be used in simultaneous communications of carrier aggregation.

As for the filter 22, Band 34 (2010 to 2025 MHz) is assigned as the pass band of the filter 221 and Band 39 (1880 to 1920 MHz) is assigned as the pass band of the filter 222.

These bands are a combination of communication bands that can be used in simultaneous communications of carrier aggregation.

As for the filter 23, Band 66 (2110 to 2220 MHz) is assigned as the pass band of the filter 231, Band 25 (1930 to 1995 MHz) is assigned as the pass band of the filter 232, and Band 30 (2350 to 2360 MHz) is assigned as the pass band of the filter 233. These bands are a combination of communication bands that can be used in simultaneous communications of carrier aggregation.

Band 7 (2620 to 2690 MHz) is assigned as the pass band of the filter 31. Band 41 (2496 to 2690 MHz) is assigned as the pass band of the filter 32.

With this configuration, the radio-frequency front-end circuit 10 can realize simultaneous communications by carrier aggregation with the use of the circuit on the multiplexer side. As a result, the radio-frequency front-end circuit 10 capable of selecting communication of carrier aggregation can be realized with a simple configuration.

Furthermore, in the radio-frequency front-end circuit 10, by using the configuration described above, an excellent transfer characteristic can be achieved with respect to radio frequency signals in the communication bands for simultaneous communication of carrier aggregation in which the requirement of loss is particularly difficult.

It should be noted that the combination of communication bands for simultaneous communication of carrier aggregation is not limited to the example presented above. For example, in the radio-frequency switch 11, by controlling the terminals Ps11, Ps12, and Ps13 to establish concurrent connections of multiple terminals, carrier aggregation is achieved by using multiple filters selected from the filters 21, 22, and 23. Furthermore, by establishing connections including the terminal Ps14 of the radio-frequency switch 11, carrier aggregation can be also achieved.

A communication band of a frequency range (MH band) lower than approximately 2.5 GHz can be assigned to each of the filters 21, 22, and 23 as multiplexers while a communication band of a frequency range (H band) including or higher than approximately 2.5 GHz can be assigned to each of the filters 31 and 32 and a filter 33 as single filters. This is because, the higher the frequency band is, the more difficult impedance matching between a multiplexer filter and the radio-frequency switch 11 is. Thus, with the configuration in which pass bands are determined as described above, the insertion loss of each multiplexer filter can be reduced and the deterioration of the transfer characteristic of the radio-frequency front-end circuit 10 can be suppressed. In other words, the transfer characteristic of the radio-frequency front-end circuit 10 can be improved.

Figure 3A:
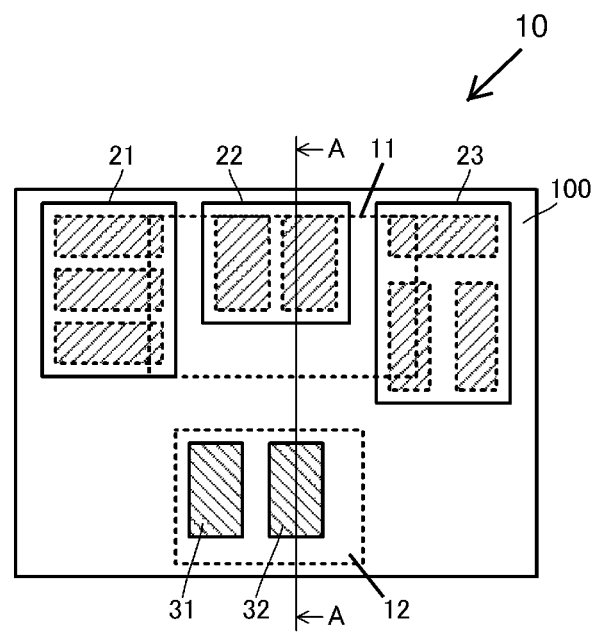
FIG. 3A is a plan view schematically illustrating a structure of the radio-frequency front-end circuit according to the first embodiment of the present disclosure and FIG. 3B is a sectional view taken along line A-A in FIG. 3A.
Figure 3B:
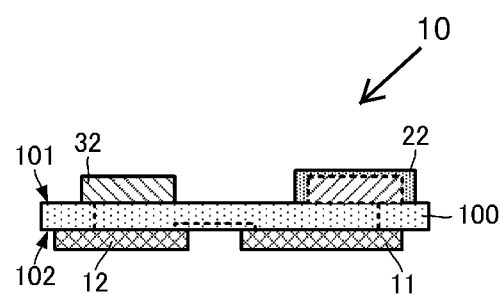

The radio-frequency front-end circuit 10 having the circuit configuration described above can be implemented by using, for example, the structures illustrated in FIGS. 3A and 3B. FIG. 3A is a plan view schematically illustrating a structure of the radio-frequency front-end circuit 10 according to the first embodiment of the present disclosure and FIG. 3B is a sectional view taken along line A-A in FIG. 3A.

As illustrated in FIGS. 3A and 3B, the radio-frequency front-end circuit 10 includes a base 100. The base 100 is formed as a flat plate and has major surfaces 101 and 102 opposite to each other. Conductor patterns that are mainly made of an insulating material and that constitute the circuit configuration of the radio-frequency front-end circuit 10 are formed at the base 100.

The filters 21, 22, 23, 31, and 32 are formed at the major surface 101 of the base 100.

The radio-frequency switches 11 and 12 are formed at the major surface 102 of the base 100.

The filters 21, 22, and 23 overlap the radio-frequency switch 11 when the base 100 is viewed in plan view. The filters 21, 22 and 23 do not necessarily overlap the radio-frequency switch 11 and only need to be positioned closer to the radio-frequency switch 11 than the radio-frequency switch 12.

The filters 31 and 32 overlap the radio-frequency switch 12 when the base 100 is viewed in plan view. The filters 31 and 32 do not necessarily overlap the radio-frequency switch 12 and only need to be positioned closer to the radio-frequency switch 12 than the radio-frequency switch 11.

With such a structure, a first conductor pattern connecting the filters 21, 22, and 23, and the radio-frequency switch 11 can be formed as a simple and short pattern. As a result, the transfer characteristic of the radio-frequency front-end circuit 10 is improved.

Similarly, a second conductor pattern connecting the filters 31 and 32, and the radio-frequency switch 12 can be formed as a simple and short pattern. As a result, the transfer characteristic of the radio-frequency front-end circuit 10 is improved.

Further, with such a structure, the first conductor pattern and the second conductor pattern do not intersect or overlap in plan view. As a result, radio-frequency coupling between the first conductor pattern and the second conductor pattern is suppressed and the transfer characteristic of the radio-frequency front-end circuit 10 is improved.

The radio-frequency switches 11 and 12 are both formed at the major surface 102 and are adjacent to each other. With such a structure, a third conductor pattern connecting the radio-frequency switches 11 and 12 can be formed as a simple and short pattern. As a result, the transfer characteristic of the radio-frequency front-end circuit 10 is improved.

Figure 4:
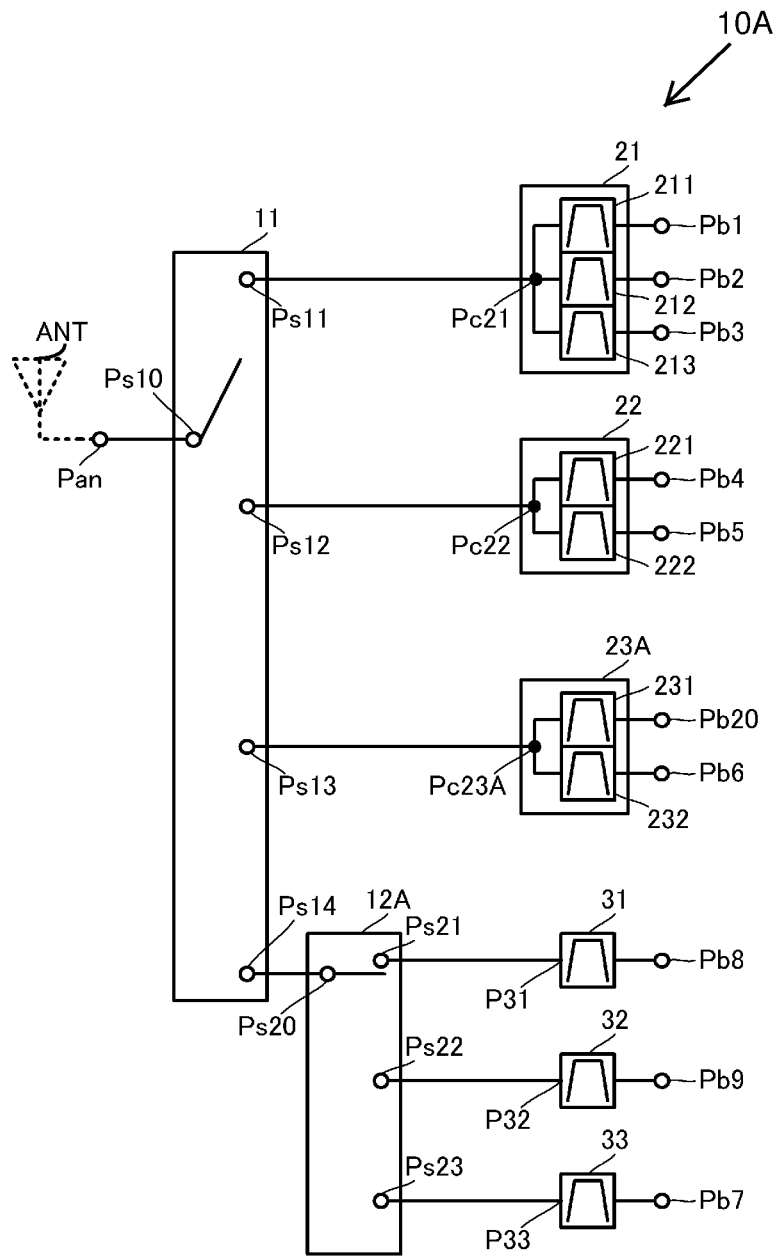
FIG. 4 is a circuit diagram of a radio-frequency front-end circuit according to a second embodiment of the present disclosure.

Next, a radio-frequency front-end circuit according to a second embodiment of the present disclosure is described with reference to a drawing. FIG. 4 is a circuit diagram of a radio-frequency front-end circuit 10A according to the second embodiment of the present disclosure.

The radio-frequency front-end circuit 10A according to the second embodiment differs from the radio-frequency front-end circuit 10 in the configuration in which a filter 23A is formed as a multiplexer composed of two single filters, the configuration in which the filter 33 is added to the configuration, and the configuration of a radio-frequency switch 12A. The other configurations of the radio-frequency front-end circuit 10A are the same as those of the radio-frequency front-end circuit 10, and the description thereof is not repeated.

The radio-frequency switch 12A is a single-pole triple-throw (SP3T) switch. The radio-frequency switch 12A includes one antenna-side terminal Ps20 and a plurality of filter-side terminals Ps21, Ps22, and Ps23. The radio-frequency switch 12A selectively connects any of the terminals Ps21, Ps22, and Ps23 to the terminal Ps20.

The filter 23A includes the filters 231 and 232. One terminal of the filter 231 and one terminal of the filter 232 are coupled to each other and this connection point is a common terminal Pc23A of the filter 23A. The common terminal Pc23A is coupled to the terminal Ps13 of the radio-frequency switch 11.

The filter 33 passes radio frequency signals in one kind of communication band and attenuates radio frequency signals in other communication bands. One terminal P33 of the filter 33 is coupled to the terminal Ps23 of the radio-frequency switch 12A and the other terminal of the filter 33 is coupled to the terminal Pb7 of the radio-frequency front-end circuit 10A.

As such, in the radio-frequency front-end circuit 10A, the filter 33 is separately provided as the single filter 33. Further, in the radio-frequency front-end circuit 10A, the filter 33 is coupled to the radio-frequency switch 12A.

With such a configuration, the radio-frequency front-end circuit 10A can also achieve the same effects and advantages as those of the radio-frequency front-end circuit 10 according to the first embodiment.

Figure 5:
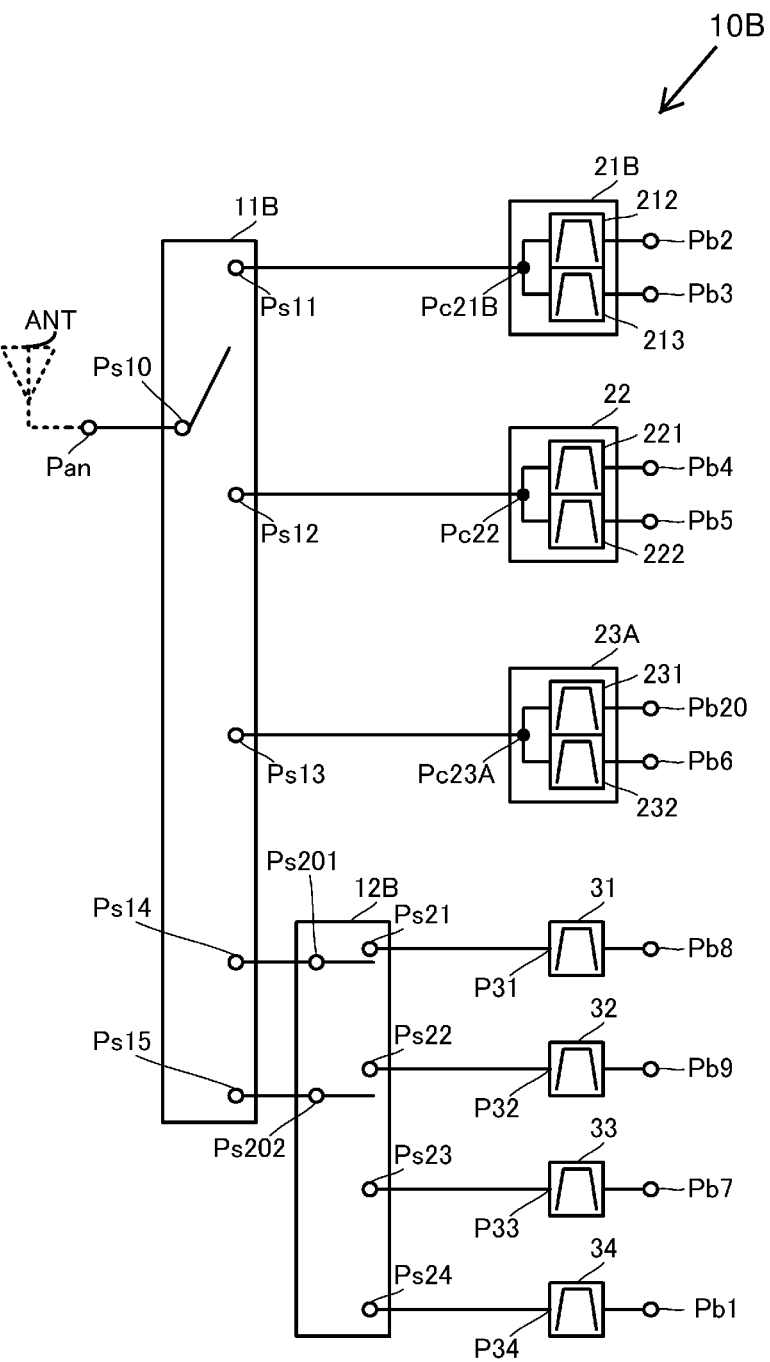
FIG. 5 is a circuit diagram of a radio-frequency front-end circuit according to a third embodiment of the present disclosure.

Next, a radio-frequency front-end circuit according to a third embodiment of the present disclosure is described with reference to a drawing. FIG. 5 is a circuit diagram of a radio-frequency front-end circuit 10B according to the third embodiment of the present disclosure.

The radio-frequency front-end circuit 10B according to the third embodiment differs from the radio-frequency front-end circuit 10A in the configuration in which a filter 21B is formed as a multiplexer composed of two single filters, the configuration in which a filter 34 is added to the configuration, and the configuration of radio-frequency switches 11B and 12B. The other configurations of the radio-frequency front-end circuit 10B are the same as those of the radio-frequency front-end circuit 10A, and the description thereof is not repeated.

The radio-frequency switch 11B is a single-pole five-throw (SPST) switch. The radio-frequency switch 11B includes one antenna-side terminal Ps10 and a plurality of filter-side terminals Ps11, Ps12, Ps13, Ps14, and Ps15. The radio-frequency switch 11B selectively connects any of the terminals Ps11, Ps12, Ps13, Ps14, and Ps15 to the terminal Ps10. At this time, the radio-frequency switch 11B causes one of the terminals Ps11, Ps12, Ps13, Ps14, and Ps15 to be connected to the terminal Ps10 or causes multiple terminals thereof to be concurrently connected to the terminal Ps10.

The radio-frequency switch 12B is a double-pole four-throw (DP4T) switch. The radio-frequency switch 12B includes two antenna-side terminals Ps201 and Ps202 and a plurality of filter-side terminals Ps21, Ps22, Ps23, and Ps24. The radio-frequency switch 12B selectively connects any of the terminals Ps21, Ps22, Ps23, and Ps24 to the terminal Ps201 or Ps202. Specifically, the radio-frequency switch 12B causes one of the terminals Ps21, Ps22, Ps23, and Ps24 to be connected to the terminal Ps201 or causes two terminals thereof to be concurrently connected to the terminal Ps202.

The terminal Ps201 is coupled to the terminal Ps14 of the radio-frequency switch 11B and the terminal Ps202 is coupled to the terminal Ps15 of the radio-frequency switch 11B.

The filter 21B includes the filters 212 and 213. One terminal of the filter 212 and one terminal of the filter 213 are coupled to each other and this connection point is a common terminal Pc21B of the filter 21B. The common terminal Pc21B is coupled to the terminal Ps11 of the radio-frequency switch 11.

The filter 34 passes radio frequency signals in one kind of communication band and attenuates radio frequency signals in other communication bands. One terminal P34 of the filter 34 is coupled to the terminal Ps24 of the radio-frequency switch 12B and the other terminal of the filter 34 is coupled to the terminal Pb1 of the radio-frequency front-end circuit 10B.

As such, in the radio-frequency front-end circuit 10B, the filter 211 in the radio-frequency front-end circuit 10A is separately provided as the single filter 34. Further, in the radio-frequency front-end circuit 10B, the filter 34 is coupled to the radio-frequency switch 12B.

With such a configuration, the radio-frequency front-end circuit 10B can also achieve the same effects and advantages as those of the radio-frequency front-end circuits 10 and 10A according to the first and second embodiments.

Figure 6:
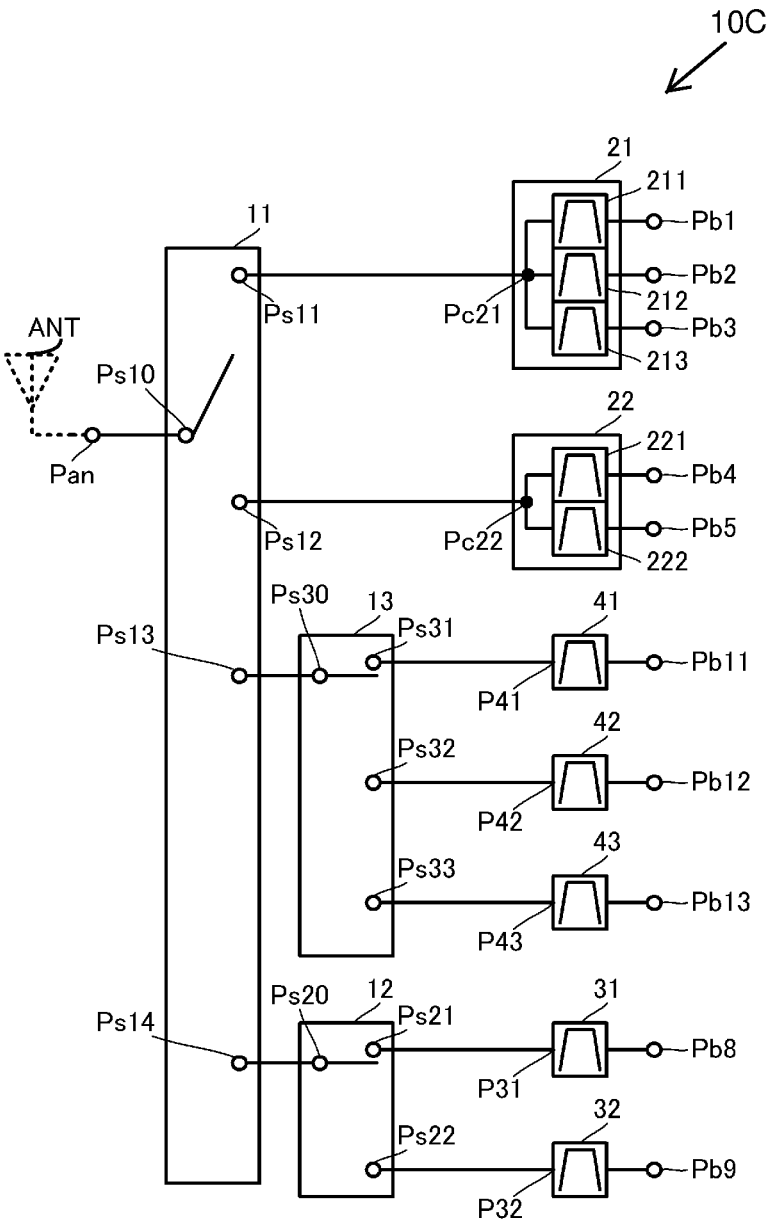
FIG. 6 is a circuit diagram of a radio-frequency front-end circuit according to a fourth embodiment of the present disclosure.

Next, a radio-frequency front-end circuit according to a fourth embodiment of the present disclosure is described with reference to a drawing. FIG. 6 is a circuit diagram of a radio-frequency front-end circuit 10C according to the fourth embodiment of the present disclosure.

The radio-frequency front-end circuit 10C according to the fourth embodiment differs from the radio-frequency front-end circuit 10 in that the filter 23 is removed and filters 41, 42, and 43 are added and that a radio-frequency switch 13 is added. The other configurations of the radio-frequency front-end circuit 10C are the same as those of the radio-frequency front-end circuit 10, and the description thereof is not repeated.

The radio-frequency switch 13 is a SP3T switch. The radio-frequency switch 13 includes one antenna-side terminal Ps30 and a plurality of filter-side terminals Ps31, Ps32, and Ps33. The radio-frequency switch 13 selectively connects any of the terminals Ps31, Ps32, and Ps33 to the terminal Ps30. The radio-frequency switch 13 causes one of the terminals Ps31, Ps32, and Ps33 to be connected to the terminal Ps30 or causes two terminals thereof to be concurrently connected to the terminal Ps30.

The terminal Ps30 of the radio-frequency switch 13 is coupled to the terminal Ps13 of the radio-frequency switch 11.

The filters 41, 42, and 43, each pass radio frequency signals in one kind of communication band and attenuate radio frequency signals in other communication bands. The bandpass characteristic of the filter 41, the bandpass characteristic of the filter 42, and the bandpass characteristic of the filter 43 are different from each other.

One terminal P41 of the filter 41 is coupled to the terminal Ps31 of the radio-frequency switch 13. The other terminal of the filter 41 is coupled to the terminal Pb11 of the radio-frequency front-end circuit 10C.

One terminal P42 of the filter 42 is coupled to the terminal Ps32 of the radio-frequency switch 13. The other terminal of the filter 42 is coupled to the terminal Pb12 of the radio-frequency front-end circuit 10C.

One terminal P43 of the filter 43 is coupled to the terminal Ps33 of the radio-frequency switch 13. The other terminal of the filter 43 is coupled to the terminal Pb13 of the radio-frequency front-end circuit 10C.

As such, in the radio-frequency front-end circuit 10C, the filter 23 in the radio-frequency front-end circuit 10 is provided as a plurality of the single filters 41, 42, and 43 in a separated manner. Further, in the radio-frequency front-end circuit 10C, the filters 41, 42, and 43 are coupled to the radio-frequency switch 13.

With such a configuration, the radio-frequency front-end circuit 10C can also achieve the same effects and advantages as those of the radio-frequency front-end circuit 10 according to the first embodiment.

It should be noted that the numbers of multiplexer filters, single filter filters, and radio-frequency switches in the above description are merely examples. Within the concept of the configurations described above, that is, when multiplexer filters are controlled by a switch in a single stage while single filters are controlled by switches in a plurality of stages, other examples may be used.

Furthermore, the number of stages of switches to which single filters are coupled may be three or more but can be two. As a result, the number of switches that transfer radio frequency signals in the communication bands corresponding to the single filters is minimized and the transmission loss of radio frequency signals in these communication bands can be suppressed.

While embodiments of the disclosure have been described above, it is to be understood that variations and modifications will be apparent to those skilled in the art without necessarily departing from the scope and spirit of the disclosure. The scope of the disclosure, therefore, is to be determined solely by the following claims.

What is claimed is:

1. A radio-frequency front-end circuit comprising:
   a first radio-frequency (RF) switch comprising a first antenna-side terminal and a plurality of first filter-side terminals, and configured to selectively connect the plurality of first filter-side terminals to the first antenna-side terminal;
   a second RF switch comprising a second antenna-side terminal and a plurality of second filter-side terminals, and configured to selectively connect the plurality of second filter-side terminals to the second antenna-side terminal;
   a multiplexer comprising a common terminal; and
   a plurality of single filters, wherein:
   the plurality of single filters are coupled respectively to the plurality of second filter-side terminals,
   the second antenna-side terminal is coupled to a first of the first filter-side terminals, and
   the common terminal of the multiplexer is coupled to a second of the first filter-side terminals.

2. The radio-frequency front-end circuit according to claim 1, wherein the first RF switch further comprises:
   a plurality of first single-pole single-throw (SPST) switches respectively coupled between the first antenna-side terminal and the plurality of first filter-side terminals, and
   a plurality of second SPST switches respectively coupled between the first SPST switches and a reference potential.

3. The radio-frequency front-end circuit according to claim 1, wherein the first RF switch is configured to concurrently connect two or more of the plurality of first filter-side terminals to the first antenna-side terminal.

4. The radio-frequency front-end circuit according to claim 2, wherein switches of the second RF switch are only third SPST switches respectively coupled between the second antenna-side terminal and the plurality of second filter-side terminals.

5. The radio-frequency front-end circuit according to claim 1, wherein a conductive resistance of the second RF switch is less than a conductive resistance of the first RF switch.

6. The radio-frequency front-end circuit according to claim 1, wherein an open capacitance of the first RF switch is less than an open capacitance of the second RF switch.

7. The radio-frequency front-end circuit according to claim 1, wherein there are fewer second filter-side terminals than first filter-side terminals.

8. The radio-frequency front-end circuit according to claim 1, comprising a plurality of second RF switches, wherein the antenna-side terminal of each second RF switch is coupled to a different first filter-side terminal.

9. The radio-frequency front-end circuit according to claim 1, further comprising:
   a base having a first major surface and a second major surface opposite the first major surface, wherein:
   the multiplexer and at least one of the single filters are mounted to the first major surface,
   the first RF switch and the second RF switch are mounted to the second major surface,
   as seen in a plan view of the radio-frequency front-end circuit, the multiplexer is closer to the first RF switch than to the second RF switch, and
   as seen in the plan view, the at least one single filter is closer to the second RF switch than to the first RF switch.

10. The radio-frequency front-end circuit according to claim 9, wherein as seen in the plan view:
    the multiplexer at least partially overlaps the first RF switch, and
    the at least one single filter at least partially overlaps the second RF switch.

11. The radio-frequency front-end circuit according to claim 1, wherein the multiplexer is coupled to the first antenna-side terminal via the first RF switch.

* * * * *

UNITED STATES PATENT AND TRADEMARK OFFICE
CERTIFICATE OF CORRECTION

PATENT NO. : 11,296,730 B2
APPLICATION NO. : 17/029584
DATED : April 5, 2022
INVENTOR(S) : Morio Takeuchi It is certified that error appears in the above-identified patent and that said Letters Patent is hereby corrected as shown below:

In the Specification

Column 11, Line 28, "(SPST)" should be -- (SP5T) --.

Signed and Sealed this
Thirty-first Day of January, 2023

Katherine Kelly Vidal
*Director of the United States Patent and Trademark Office*